US008094981B2

(12) United States Patent
Harris

(10) Patent No.: US 8,094,981 B2
(45) Date of Patent: Jan. 10, 2012

(54) THREE COLOR DIGITAL GOBO SYSTEM

(75) Inventor: Jeremiah J Harris, Las Vegas, NV (US)

(73) Assignee: Production Resource Group, L.C.C, New Windsor, NY (US)

( * ) Notice: Subject to any disclaimer, the term of this patent is extended or adjusted under 35 U.S.C. 154(b) by 93 days.

(21) Appl. No.: 12/755,138

(22) Filed: Apr. 6, 2010

(65) Prior Publication Data

US 2010/0188019 A1    Jul. 29, 2010

Related U.S. Application Data

(63) Continuation of application No. 12/401,025, filed on Mar. 10, 2009, now Pat. No. 7,693,368, which is a continuation of application No. 12/054,767, filed on Mar. 25, 2008, now Pat. No. 7,502,535, which is a continuation of application No. 11/677,022, filed on Feb. 20, 2007, now Pat. No. 7,349,606, which is a continuation of application No. 11/386,194, filed on Mar. 21, 2006, now Pat. No. 7,181,112, which is a continuation of application No. 10/995,612, filed on Nov. 22, 2004, now Pat. No. 7,020,370, which is a continuation of application No. 10/616,481, filed on Jul. 8, 2003, now Pat. No. 6,823,119, which is a continuation of application No. 09/771,953, filed on Jan. 29, 2001, now Pat. No. 6,588,944.

(51) Int. Cl.
*G02B 6/26* (2006.01)
*G02B 26/00* (2006.01)
*G09F 13/00* (2006.01)
*H05B 37/02* (2006.01)

(52) U.S. Cl. .......... 385/31; 385/100; 385/115; 385/116; 385/88; 385/147; 385/901; 359/291; 362/231; 362/232; 362/551; 362/556; 362/295; 362/296.05; 315/294

(58) Field of Classification Search .................. 385/88, 385/89, 92, 49, 115, 116, 14, 147, 901, 37, 385/100, 31; 359/291, 223, 224; 382/217, 382/220, 190; 348/241, 220, 190; 362/232, 362/556, 293, 296, 231, 551, 296.05; 315/294
See application file for complete search history.

(56) References Cited

U.S. PATENT DOCUMENTS

| | | | |
|---|---|---|---|
| 5,053,765 A | 10/1991 | Sonehara et al. | 340/815.43 |
| 5,151,718 A | 9/1992 | Nelson | 346/160 |
| 5,386,250 A | 1/1995 | Guerinot | 348/770 |
| 5,774,174 A | 6/1998 | Hardie | 348/38 |
| 5,796,526 A | 8/1998 | Anderson | 359/671 |
| 5,828,485 A | 10/1998 | Hewlett | 359/223 |
| 5,940,204 A | 8/1999 | Hewlett | 353/121 |
| 5,997,150 A | 12/1999 | Anderson | 362/227 |
| 6,057,958 A | 5/2000 | Hunt | 348/246 |
| 6,188,933 B1 | 2/2001 | Hewlett et al. | 359/291 |
| 6,208,087 B1 | 3/2001 | Hughes et al. | 315/291 |
| 6,331,756 B1 | 12/2001 | Belliveau | 315/316 |
| 6,536,922 B1 | 3/2003 | Hewlett et al. | 362/200 |
| 6,538,797 B1 | 3/2003 | Hunt | 345/418 |

(Continued)

*Primary Examiner* — Brian Healy
(74) *Attorney, Agent, or Firm* — Law Office of Scott C. Harris, Inc.

(57) ABSTRACT

A system of digitally controlling light output by producing separate control signals for different colors of light. The light is contained in an optical waveguide, either prior to shaping or after shaping. Each of the control signals is coupled to a digitally controlled device which controls the shape of the light output. The digital controlling device can be digital mirror devices, for example.

25 Claims, 2 Drawing Sheets

U.S. PATENT DOCUMENTS

| | | | |
|---|---|---|---|
| 6,588,944 B2 | 7/2003 | Harris | 385/88 |
| 6,605,907 B2 | 8/2003 | Belliveau | 315/204 |
| 6,617,792 B2 | 9/2003 | Hughes et al. | 315/32 |
| 6,823,119 B2 | 11/2004 | Harris | 385/100 |
| 6,891,656 B2 | 5/2005 | Hunt | 359/291 |
| 6,988,817 B2 | 1/2006 | Hewlett et al. | 362/321 |
| 7,020,370 B2 | 3/2006 | Harris | 385/100 |
| 7,181,112 B2 * | 2/2007 | Harris | 385/100 |
| 7,502,535 B2 * | 3/2009 | Harris | 385/100 |
| 7,693,368 B2 * | 4/2010 | Harris | 385/31 |
| 2002/0181070 A1 | 12/2002 | Hewlett | 359/291 |
| 2005/0100289 A1 | 5/2005 | Harris | 385/88 |
| 2006/0177185 A1 | 8/2006 | Harris | 385/100 |
| 2010/0188019 A1 * | 7/2010 | Harris | 315/294 |

* cited by examiner

THREE COLOR DIGITAL GOBO SYSTEM

CROSS-REFERENCE TO RELATED APPLICATIONS

This application is a continuation application of and claims priority to U.S. application Ser. No. 11/386,194, now U.S. Pat. No. 7,181,112, filed Mar. 21, 2006; which is a continuation application of U.S. application Ser. No. 10/995,612, filed Nov. 22, 2004, now U.S. Pat. No. 7,020,470; which is a continuation of U.S. application Ser. No. 10/616,481, filed Jul. 8, 2003, now U.S. Pat. No. 6,823,119; which is a continuation of U.S. application Ser. No. 09/771,953, filed Jan. 29, 2001, now U.S. Pat. No. 6,588,944.

BACKGROUND

The U.S. Pat. No. 5,940,204 has suggested using a digital device to shape the contour and outlines cf light that is projected through a high-intensity projector. Such a system may be used, for example, for stage lighting in theatrical and concert events. The Icon M™, available from Light and Sound Design, Ltd; Birmingham, England, uses this technique.

Different patents owned by Light and Sound Design, Ltd. suggest that the digital gobo should be formed from either a digital mirror, or from any other pixel level controllable digital device.

Cogent Light of Los Angeles, Calif. has technology that allows packaging a high intensity light beam into a form that allows it to be placed into a light waveguide, e.g., a fiber optic cable.

SUMMARY

The present application teaches a system of packaging light into a light waveguide such as a fiber optic cable, and adjusting the shape of the light using a digitally controllable, pixel level controllable light shaping element, such as a digital mirror device (DMD), available from Texas Instruments.

In one embodiment, the system controls and produces high-intensity light output using three separate digital gobo devices. The digital gobo devices can be separately controlled such that each digital gobo device receives information indicative of shaping a separate primary color. The primary colors are handled separately, and/or combined at the object of the high-intensity light output.

BRIEF DESCRIPTION OF THE DRAWINGS

These and other aspects will now be described in detail with reference to the accounts, wherein.

DETAILED DESCRIPTION

Details of a lighting instrument using a digital gobo are described in many patents owned by Light and Sound Design Ltd and the basic features are also present in Light and Sound Design's Icon M™ lighting fixture. The system described herein may use any of these basic features including details of computer-controlled cooling, and optics.

Figure 1:
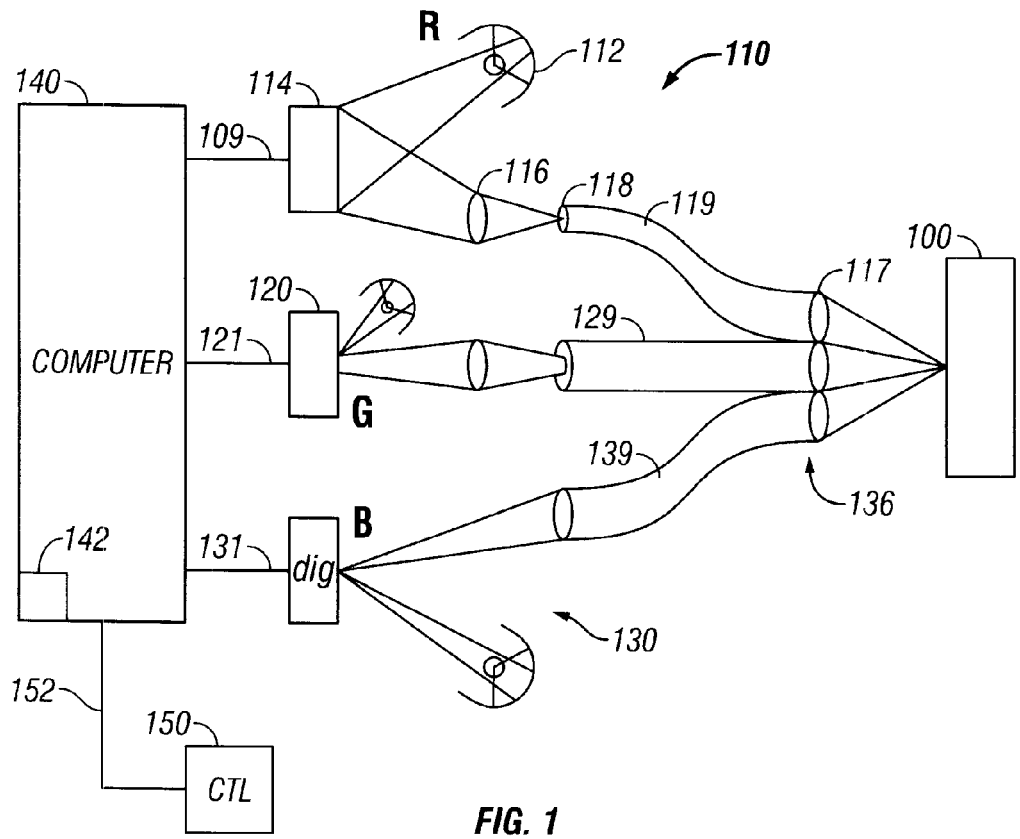
FIG. 1 is a block diagram of a three color version of the system.

A block diagram of the basic system is shown in FIG. 1. An object of lighting 100 is shown. This object may be a stage, or may be any other object which is conventionally by a high-intensity lighting device. The high-intensity lighting device may be, for example, a lighting device which produces more than 100 watts of lighting output, preferably more than 500 watts of lighting output. Devices of this type conventionally use a spotlight with a special high intensity bulb for producing the desired illumination effect.

In FIG. 1, three separate lighting units are formed. Each lighting unit is responsible for producing light of a separate primary color. The primary colors can be red, green and blue for additive colors, and cyan, magenta and yellow for subtractive coloration.

Each of the lighting units 110, 120 and 130 are formed of similar structure. The lighting unit 110 includes a light source 112 which produces light of a specified primary color, here red. The lighting unit 110 may produce red coloration, or may include a white light with a red filter, or may even produce pure white light which is later filtered. The light from source 112 is applied to digital gobo device 114. The digital gobo device 114 may be a digital mirror device available from Texas Instruments. Alternatively, the digital mirror device can be some other digitally controllable, pixel level controllable optical device such as, but not limited to, a grating light valve. The digital gobo device 114 is a controlling computer 140 which runs a specified program 142. A controller 150 may be remote from the computer 140, and connected to the computer by a line 152. For example, the computer 140 may be within a separate lighting fixture along with the lighting elements 110, 120 and 130, and a remote central controller 150 may be a lighting control console.

The light output from the digital mirror device 114 is focused by an optics assembly 116, and focused to the input end 118 of an optical waveguide 119. The optical waveguide 119 may be, for example, a fiber-optic device including single or multiple fibers. The light input at end 119 is output at end 117, and coupled towards the object 100. Analogously, the other lighting unit 120 focuses its light onto a fiber-optic device 129, and the lighting device 130 focuses its light onto a fiber-optic device 139. Each of the lights may have different characteristics, i.e. they may have different coloration. The output of the three fiber-optic devices 119, 129 and 139 are bundled together at area 136, and are pointed towards the object of lighting 100.

In this way, a number of advantages may be obtained. First, brighter light and different kinds of control may be obtained since the system disclosed herein uses three separate light sources. Moreover, better control over the digital gobo may be obtained since red; green and blue are separately controlled. Less flickering may be obtained, and more brightness, as compared with a system that uses only one DMD. Still a system that uses only one DMD is contemplated as described herein.

Different modifications on this system are possible. Other optical waveguides besides a fiber-optic pipe may be used in this system. Moreover, the optical filter which changes each of these separate light components to a separate light characteristic may be located after the digital mirror, e.g. as part of the optics assembly 116, or on the input end of the fiber-optic device 118.

Figure 2:
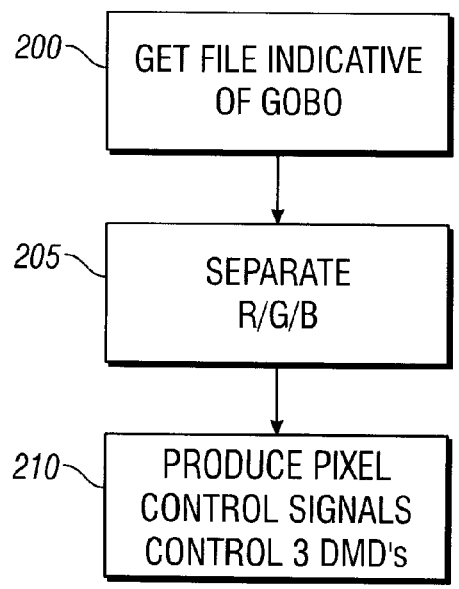
FIG. 2 shows a flowchart of operation of the controlling process for the digital gobo's in FIG. 1.

The system is controlled according to the flowchart of FIG. 2. At 200, a file indicative of a shaping of the light, e.g. a gobo to be used, is obtained. This file may be, for example, of the format described in U.S. Pat. No. 6,057,958. Of course, any file format can be used to define the gobo. The definition can be monochrome, gray scale, or full color (three different colors). At 205, the file is changed to an image, and separated into its primary color components. In the example given herein, the primary color components may include red, green and blue. Hence the file is separated into red, green and blue components. Such separation is conventional in video processing, and produces three separate signals. These three separate signals will eventually be used as the three separate controlling signals 109, 121 and 131 respectively driving the red green and blue subassemblies. The control of the three separate digital mirror devices is carried out at 210.

Figure 3:
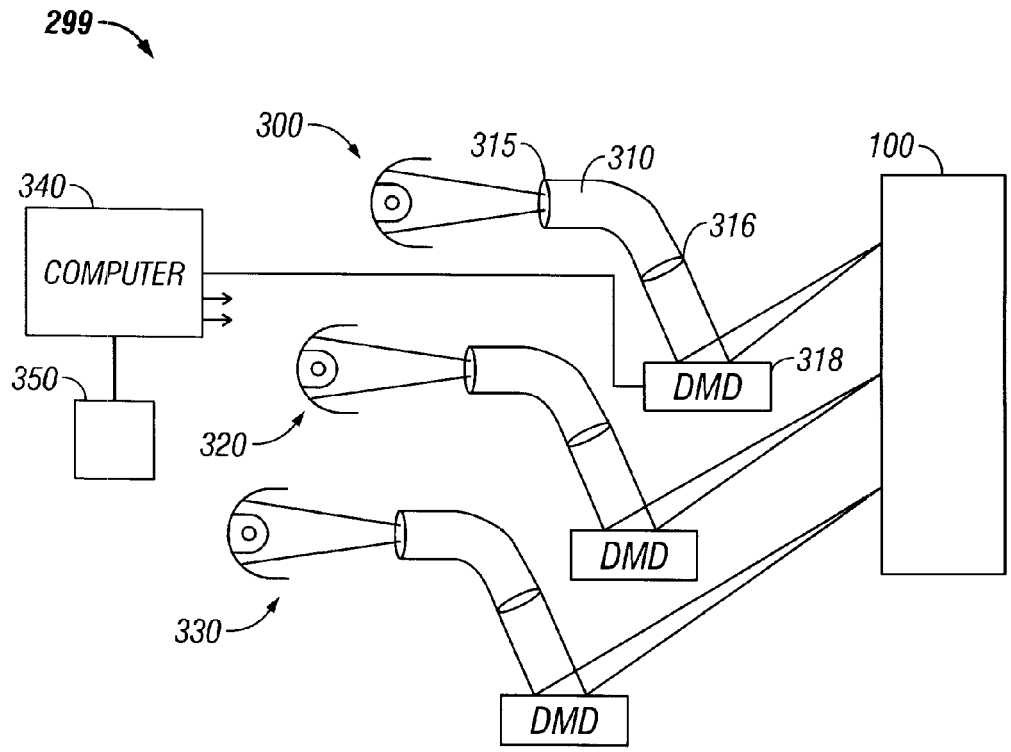
FIG. 3 shows a 3 DMD solution using three optical pipes.

FIG. 3 shows an alternative embodiment which uses a similar concept. In the FIG. 3 embodiment, light Is first launched from a light source 300 directly into a fiber-optic cable 310. In this embodiment, the optics are shown as 315, and are formed directly on the input end of the fiber-optic cable 310. Light is launched into the fiber-optic cable, and hence may be focused and or colored by the optics 315. Of course, this system may also use the separate optics shown as 116 in the FIG. 1 embodiment. Light is output on the output in 316 of the fiber-optic cable 310, and coupled to a digital mirror device 318 which shapes the light and reflects it towards the object 100.

The above has described a first channel shown as 299. A separate second channel 320 produces a similar light alteration for the second aspect of light, while a third channel 330 produces a separate output for the third aspect of light; where the aspects can be colors. Each of the digital mirror devices may be controlled by the computer shown as 340 which may be controlled from a remote console 350.

While the above has described control using three separate colors, it should be understood that two separate colors could also alternatively be used. Moreover, while the above describes the different aspects of light which are separately controlled being colors, it should be understood that any different aspect of shaping the beam of light could be separately controlled. For example, one alternative might use different intensity lights, each of which are separately controlled to produce some other kind of effect.

Figure 4:
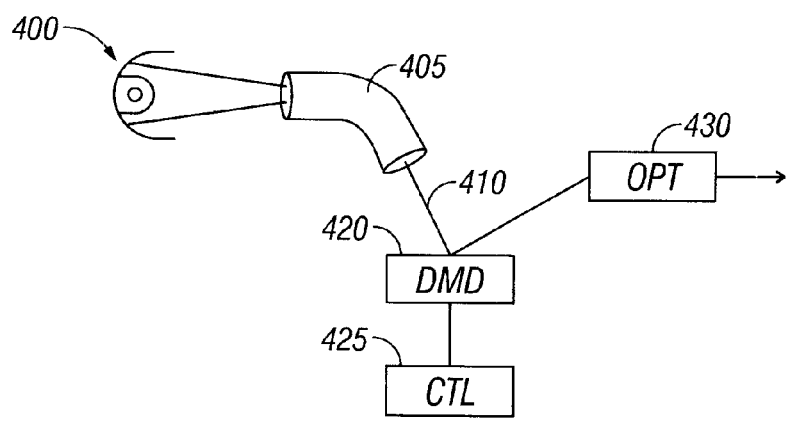
FIG. 4 for shows a single DMD solution.

Another embodiment is shown in FIG. 4. In this embodiment, a single DMD solution is shown. Light from the light 400 is immediately launched into an optical waveguide, e.g. fiber 405. The fiber can be located in any configuration. It produces its light output 410 at the area of DMD 420. As conventional, the DMD is controlled by a controller 425. An optical assembly 430 receives the light from the DMD, and transmits it towards the object of illumination. The optical element 430 may include a color changing element therein, or multiple color changing elements, in order to produce full-color output. For example, the optical element 430 may include a spinning Red/Green/Blue filter which spins in synchronism with the changing of patterns on the DMD.

Although only a few embodiments have been disclosed in detail above, other modifications are possible. All such modifications are intended to be encompassed within the following claims, in which:

What is claimed is:

1. A lighting assembly comprising:
    a first light source which produces a first light output of a first color;
    a second light source which produces a second light output of a second color, different than the first color;
    a controller, which controls separately the intensity of said first light source and said second light source;
    an optical combining part, which combines said first light output with said second light output, to create a composite light output, wherein said composite light output includes a combination of said first light output and said second light output; and
    at least one digitally controllable light shape controlling part that controls an outer shape of said composite light output, said at least one light shape controlling part controlled by said controller to change said outer shape between a first light output and a second light output.

2. A light assembly as in claim 1, further comprising a third lamp, which produces a third light output of a third color, wherein said controller controls separately the intensity of said third light source, and said optical combining part also combines said third light output to create said composite light output that includes all of said first, second and third light outputs.

3. A lighting assembly as in claim 1, wherein said optical combining part includes an optical waveguide therein, which directs said light output towards an object of lighting.

4. A lighting assembly as in claim 3, wherein said optical waveguide is an optical fiber.

5. A lighting assembly as in claim 3, wherein said optical waveguide receives light from both said first light output and from said second light output.

6. A lighting assembly as in claim 1, wherein said digitally controllable light shape controlling part includes a digital gobo.

7. A lighting a system as in assembly as in claim 6, wherein said digital gobo includes a digital mirror device which is digitally controllable.

8. A light assembly as in claim 1, wherein said first light source and said second light source are controlled over a single channel.

9. A light assembly as in claim 2, wherein said first light source, said second light source, and said third light source each output primary colors.

10. A lighting device, comprising:
    a first light source which produces a first light output of a first color;
    a first digital gobo which digitally controls a first outer shape of at least part of said light output based on a digital control indicative of a file that represents said first outer shape;
    a second light source which produces a second light output of a second color different than said first color;
    a second digital gobo which digitally controls a second outer shape of at least part of said light output based on a digital control indicative of a file that represents said second outer shape;
    a controller that controls said first light source, said second light source, said first digital gobo and said second digital gobo, and which separately controls characteristics of each of said first light source, said second light source, said first digital gobo and said second digital gobo; and
    an optical combiner which combines an output of said first light source as shaped by said first digital gobo with an output of said second light source as shaped by said second digital gobo to produce a composite light output.

11. A lighting device as in claim 10, wherein said controller controls separately the intensity of said first light output, and of said second light output and where said first light output has a different intensity than said second light output.

12. A lighting device as in claim 10, further comprising a third light source which produces a different color light than either said first or second light source.

13. A lighting device as in claim 12, wherein said first, second and third light sources are each primary colors.

14. A lighting device as in claim 10, wherein said optical combiner is an optical waveguide which combines output from said first and second light sources.

15. A lighting device as in claim 14, wherein said optical wave guide includes an optical fiber.

16. A method comprising:
controlling production of a first light output of a first color;
controlling production of a second light source which produces a second light output of a second color, different than the first color;
controlling separately the intensity of said first light source and said second light source;
combining said first light output with said second light output, to create a composite light output, wherein said composite light output includes a combination of said first light output and said second light output; and
controlling an outer shape of said composite light output, said at least one light shape controlling part controlled by said controller to change said outer shape between a first light output and a second light output.

17. A method as in claim 16, further comprising controlling production of a third light output of a third color, and controlling separately the intensity of said third light source, and combining said third light output to create said composite light output that includes all of said first, second and third light outputs.

18. A method as in claim 16, wherein said optical combining part includes an optical waveguide therein, which directs said light output towards an object of lighting.

19. A method as in claim 18, wherein said optical waveguide is an optical fiber.

20. A method as in claim 16, wherein said controlling outer shape comprises digitally controllable light shape controlling part includes a digital gobo.

21. A method as in claim 16, further comprising controlling said first light source and said second light source over a single channel.

22. A method as in claim 16, wherein said first light source, said second light source, and said third light source are each output primary colors.

23. A lighting control console, comprising:
a computer based part that produces an output for controlling a first light source of a first color on a first channel, said part also producing an output for controlling a digital gobo that changes a shape of a beam projected by said first light source, and said part also producing a second output for controlling a second light source of a second color on a second channel, and said part also producing a third output for controlling a third light source of a third color on a third channel, wherein said first, second and third colors are each primary colors, and said said control produces an output to create a full color effect, and where each of said first, second and third outputs summed to produce an overall lighting effect.

24. A console as in claim 23, wherein said first light source is controlled to have a different intensity than said second light source.

25. A console as in claim 23, wherein said first light source is controlled have a different color than said second light source.

* * * * *